Oct. 28, 1969 R. H. McMANN, JR 3,475,548

FIELD SEQUENTIAL COLOR SCAN CONVERTER

Filed Dec. 12, 1966 2 Sheets-Sheet 1

INVENTOR.
RENVILLE H. Mc MANN, J
BY
Brumbaugh, Free, Graves & Donohue
his ATTORNEYS Oct. 28, 1969 R. H. McMANN, JR 3,475,548

FIELD SEQUENTIAL COLOR SCAN CONVERTER

Filed Dec. 12, 1966 2 Sheets-Sheet 2

INVENTOR.
RENVILLE H. Mc MANN, JR

BY
Brumbaugh, Free, Graves & Donohue his ATTORNEYS 3,475,548
FIELD SEQUENTIAL COLOR SCAN CONVERTER Renville H. McMann, Jr., New Canaan, Conn., assignor to Columbia Broadcasting System, Inc., New York, N.Y., a corporation of New York Filed Dec. 12, 1966, Ser. No. 600,857
Int. Cl. H04n *1/46, 9/34*
U.S. Cl. 178—5.2 11 Claims

ABSTRACT OF THE DISCLOSURE

A system for converting sequentially derived color television signals to that of the simultaneous type by modulating the low definition primary color signals on respective subcarriers which are combined with a high definition luminance signal and displayed on a conventional black and white CRT. The face of the CRT is scanned by a camera tube and the composite signal demodulated to obtain a simultaneous color signal.

Figure 1:
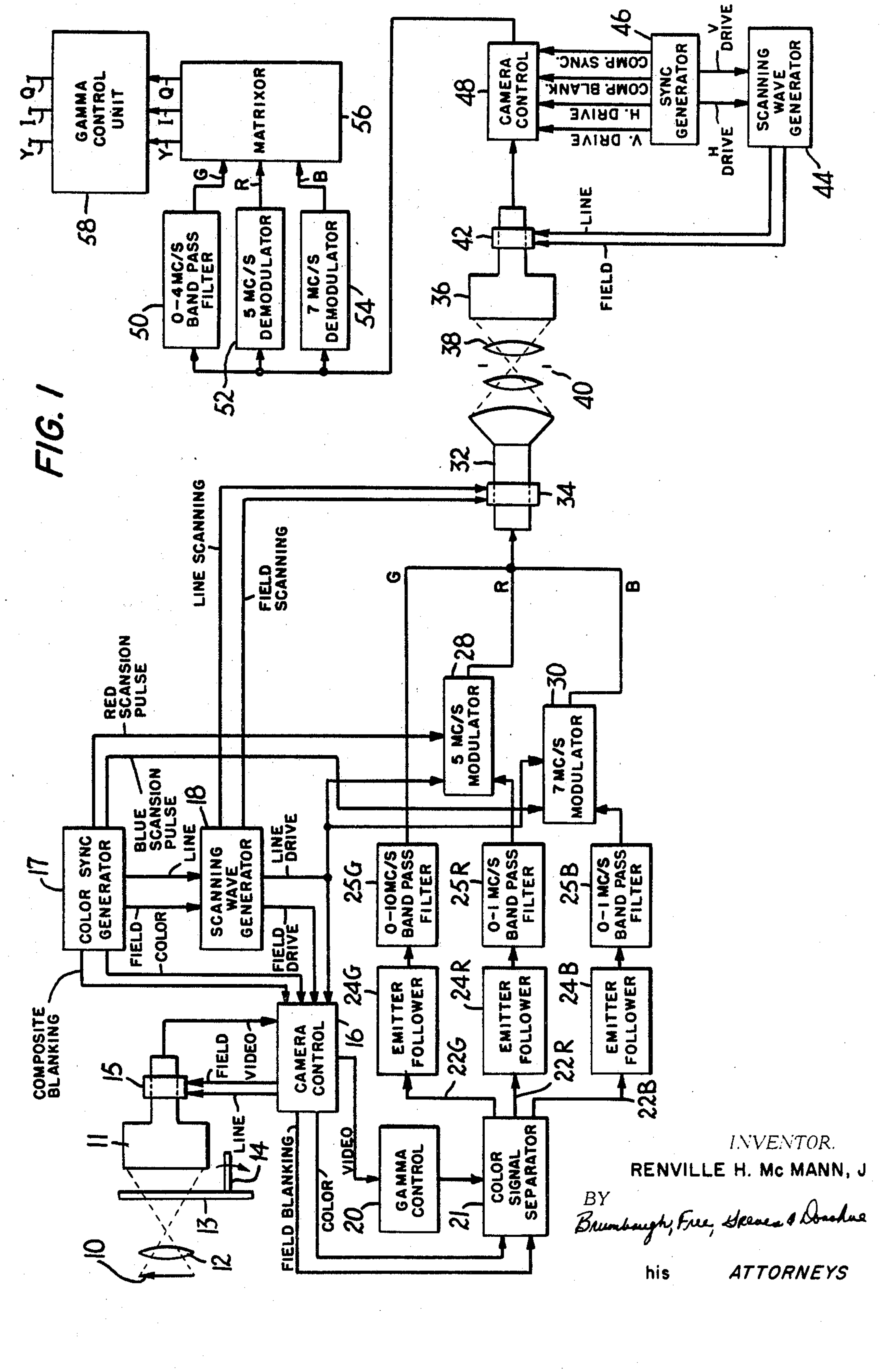

This invention relates to color television systems and, more particularly, to a new and improved color television system which provides NTSC luminance and chrominance signals from sequentially derived color field signals.

In color television systems of the simultaneous type, three separate scanning devices in conjunction with suitable optical arrangements are employed to scan three different color images of one object field at the same time. Because the three scanning devices are independently operative, registration problems often arise which are difficult to resolve and which involve expensive camera equipment and careful maintenance. When misregistration between the scanning devices occurs, the quality of the developed luminance signal Y and the chrominance signals I and Q will be impaired because the three primary color components of the object field will be out of synchronism and unbalanced. This will correspondingly cause loss of detail and quality of a picture when reproduced in a color television receiver or a monochrome receiver and loss of color definition and intensity of the picture when reproduced in color.

In an attempt to avoid misregistration problems to thereby improve the quality of reproduced images, systems have been proposed which employ a singular scanning device, operating in a field sequential manner, to derive sequential color television signals. An elaborate and complex conversion network is then provided which converts these sequential color signals into three simultaneous color field signals. Such systems, however, have not been commercially successful due to the relatively high degree of color degradation and distortion inherent in the conversion process.

Accordingly, it is an object of the present invention to provide a color television system which provides simultaneous color signals while retaining the advantages of sequential color field scanning.

It is another object of the present invention to provide a color television system which converts sequentially derived color field signals into simultaneous color signals with a minimum of color distortion and degradation.

These and other objects of the present invention are accomplished by deriving sequential color field signals which represent different color components of an object field and then passing these color signals through a filter and modulator network wherein selected frequency components of at least one of the color information signals is modulated onto a carrier signal. Thereafter, the unmodulated and modulated color information signals are sequentially reproduced by a reproducing device and scanned by a cooperating scanning device to convert the color signals into a color field signal composed of modulated and unmodulated primary color component line portions. This color field signal is then passed through a detection network wherein the color component line portions are separately detected and recombined to provide standard luminance and chrominance signals.

In one embodiment of the invention, selected frequency bands of the red and blue color information signals are modulated onto different high frequency carrier signals and supplied to a cathode ray tube along with a luminance information signal for example, green or a combination of red, blue and green, for sequential reproduction. A cooperating scanning device then converts the images into a color field signal having an unmodulated green color component line portion and modulated red and blue color component line portions. In another embodiment of the invention, a pair of cathode ray tubes with cooperating scanning devices are employed to simultaneously convert successive color portions into a standard luminance signal and into a color field signal having an unmodulated green color component line portion and modulated red and blue color component line portions.

Figure 2:
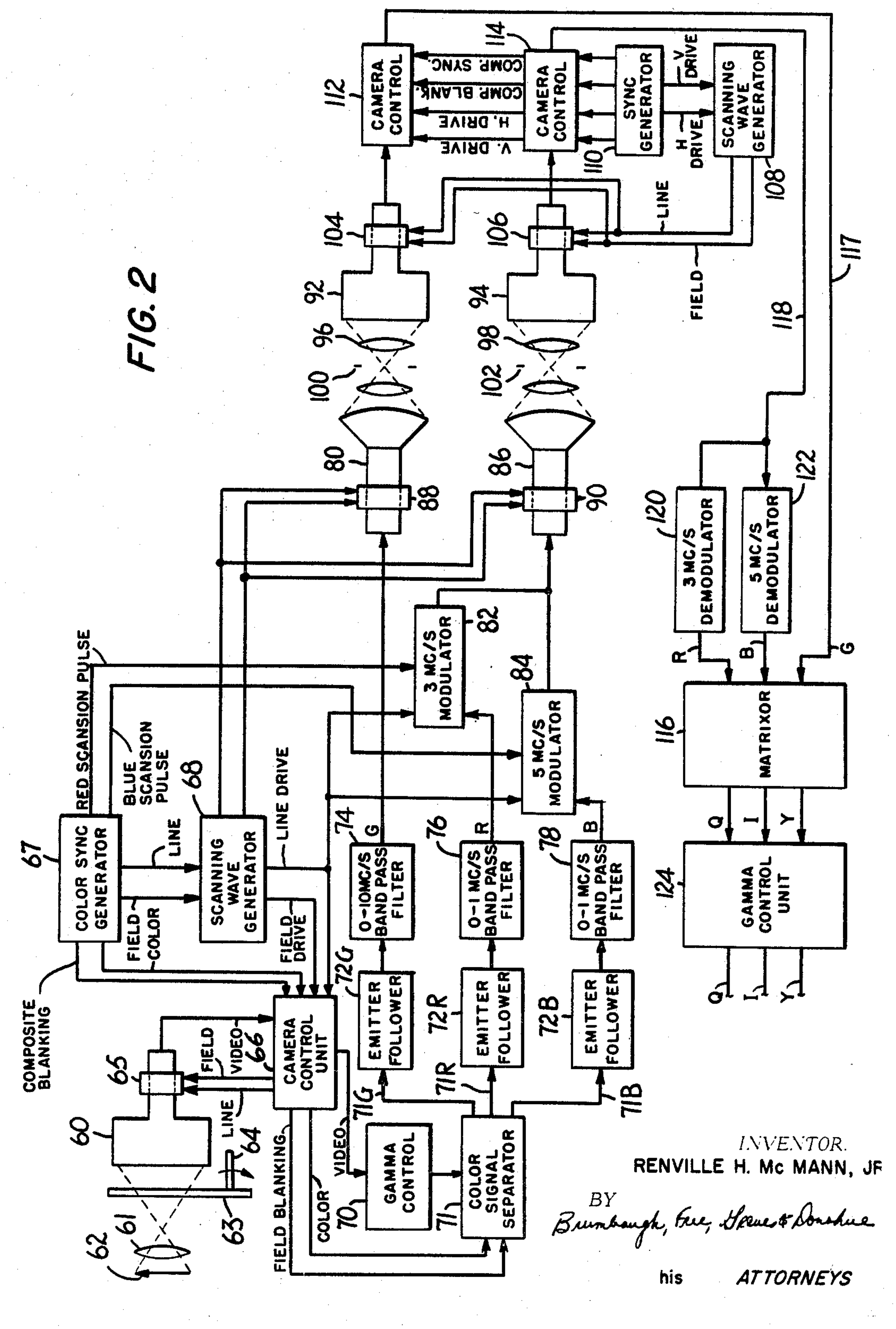

Further objects and advantages of the invention will be apparent from a reading of the following description of specific embodiments thereof, taken in conjunction with the accompanying drawings, in which:

FIGURE 1 is a schematic block diagram illustrating the arrangement of one embodiment of the invention; and FIGURE 2 is a schematic block diagram illustrating the arrangement of another embodiment of the invention.

Referring to FIGURE 1, an object field 10 is scanned by a color television camera of the sequential type. As shown, the camera includes a scanning device 11 of the image orthicon type with a cooperating lens 12 which focuses images of the object field 10 on the light sensitive surface of the scanning tube 11. Between the lens 12 and the device 11 there is interposed a color filter device 13 which sequentially presents different color aspects of the object field 10 to the scanning device 11. The color filter device is here shown as a disk rotating about an axis 14, the disk having one or more sets of color filters arranged angularly around the periphery thereof so that, as the disk rotates, different color filters are interposed in the path of the light to the tube 11.

The scanning beam in the tube 11 is deflected in the line and field directions by a suitable scanning yoke 15 which is energized with respective sawtooth waves from a camera control unit 16. In the specific arrangement shown, the camera is of sequential type and the color disk is rotated in synchronism with the field scansions so that the color changes from one field scansion to the next. In order to obtain synchronization of the camera and associated units, a color synchronizing generator 17 is provided which generates line and field drive pulses of suitable frequency. In a typical arrangement, the field scansion frequency is a nominal 180 fields per second and the line scansion frequency is a nominal 47,250 cycles per second in order to produce a 525 line, double-interlaced scanning pattern. To maintain proper color synchronization, the generator 17 also produces distinctive color synchronizing pulses which recur at the frequency of a selected color, say green. Thus, the color pulses have a frequency of 15,750 pulses per second. The generator 17 also produces composite line and field blanking signals in accordance with the usual practice.

The line drive pulses are supplied from the generator 17 via a scanning wave generator 18 to the camera control unit 16 as indicated by the labeled lines. Line deflecting sawtooth waves are produced in the unit 16 and supplied to the deflection yoke 15 of the camera tube 11. Field drive pulses are supplied from the generator 17 by way of the scanning wave generator 18 to the unit 16, as indicated by the labeled lines, and field deflection sawtooth waves produced in the unit 16 are supplied to the deflection yoke 15.

For convenience, the color synchronizing generator 17 may be synchronized with the 60 cycle power line so that the field frequency is an exact multiple of the 60 cycle power. A synchronous motor (not shown) may be used to drive the shaft 14 of the color disk so that the disk will rotate in synchronism with the field scansions. Provision is made for controlling the phase of the rotating disk with respect to the 60 cycle mains so that the proper phase may be maintained between the color segments of the disk and the corresponding field scansions.

The sequential color video signal developed by the camera tube 11 is applied to the camera control unit 16 as indicated and combined therein with the composite line and field blanking waves from the generator 17. Thereupon, the video signal is supplied through a gamma control unit 20 to a color signal separator 21. As will be explained hereinbelow, the gamma control unit 20 corrects for the transfer gradient of a cathode ray tube used in the present illustrated embodiment in order to provide the color component portions of the video signal with the proper amplitude and phase relation.

The color signal separator 22 contains circuits for separating portions of the sequential signal representing one primary color component of the field 10 from those representing the other primary color components so that an output lead 22G contains only the green color component portions of the video signal, an output lead 22R contains only the red color components and an output lead 22B contains only the blue color components. Switching circuits suitable for use in the color separator 21 are well known in the art and need not be described in detail herein. As an example, the input sequential color video signal may be supplied to three channels in the separator 21 and field blanking signals derived from the field drive signals may be applied to the three channels from the camera control unit 16, as indicated, so as to blank out the channels in sequence. The color pulses supplied to the generator 22 from the unit 16 may be employed to preserve proper color synchronization so that the signals supplied to the output lead 22G always contain the green components, the output lead 22R always contains the red components and the output lead 22B always contains the blue components.

Coupled to the output leads 22G, 22R and 22B of the separator 21 are emitter follower circuits 24G, 24R and 24B, respectively. The emitter follower circuits 24G, 24R and 24B are independently operative and yield green, red and blue color component signals which will correspond to the proper proportions of a standard luminance signal Y when combined together. More particularly, the voltage signal of the luminance signal Y is given by the following expression:

$$Ey=0.59\ E_G\times 0.30\ E_R\times 0.11\ E_B$$

Accordingly, the emitter follower circuit 24G is effective to reduce the magnitude of the green component to 59% of its original value, the emitter follower circuit 24R is effective to reduce the magnitude of the red component to 30% of its original value and the emitter follower circuit 24B is effective to reduce the magnitude of the blue component to 11% of its original value. It will be understood, of course, that the amplification of the color component portions of the video signal by the individual emitter follower circuits may be varied to suit the requirements of any system.

In accordance with the invention, the green, red and blue color component portions of the video signal are then applied to a 0–10 megacycle per second (mc./s.) bandpass filter 25G, a 0–1 mc./s. bandpass filter 25R and a 0–1 mc./s. bandpass filter 25B, respectively. The filters may be conventionally constructed and, hence, the filter 25G passes all the components of the green color portion within a 0 to 10 mc./s. frequency range and the filters 25R and 25B pass all the components of the red and blue color portions, respectively, within a 0 to 1 mc./s. frequency range. The frequency restriction on the red and blue color component portions will, of course, cause some diminution of the color detail in a picture reproduced in a color receiver. However, this loss of color detail will not be visible to the viewer.

Coupled to the output terminals of the filters 25R and 25B are a 5 mc./s. modulator 28 and a 7 mc./s. modulator 30, respectively, which supply high frequency carrier signals each time the modulators are gated with respective red and blue field scansion pulses. Line drive pulses are also supplied from the scanning wave generator to the modulators 28 and 30 to insure that the carrier starts in-phase with each horizontal line scan. Accordingly, the red color component portion of the video signal is modulated onto a 5 mc./s. carrier each time the modulator 28 is enabled by a red scansion pulse and the blue color component portion of the video signal is modulated onto a 7 mc./s. carrier each time the modulator 30 is enabled by a blue scansion pulse. The red and blue control or field scansion pulses are generated by the color synchronizing generator 18 each time the camera is exposed to the red and blue segments, respectively, of the filter device 13 while the camera is scanning the object field 10. Exact synchronization of the modulating action and the application of the red and blue color component portions to the input terminal of the modulators 28 and 30, respectively, prevents the modulation of different leakage color component portions. Accordingly, during every six field scansions, the red and blue color component portions are modulated onto 5 mc. and 7 mc. carrier signals, respectively, the odd and even lines being modulated alternately.

The output terminals of the 0–10 mc./s. bandpass filter 25G and the modulators 28 and 30 are connected together and to a cathode ray tube 32 which sequentially reproduces the broadband green color component portion of the video signal and the frequency limited and modulated red and blue color component portions. It is noticeable that by recombining the green color component portion and the modulated red and blue color component portions, there is produced a luminance signal Y which is substantially representative of the standard NTSC luminance signal Y except for the fact that the field scansion rate is three times higher than that of the conventional signal. Also, even though only the red and blue color components within a 0 to 1 mc./s. frequency range are employed to modulate the 5 mc./s. and 7 mc./s. carrier signals, respectively, enough color detail is retained to insure excellent color reproduction. Although either the blue or red portion might be transmitted broadband and without modulation rather than the green portion, it is preferable that the entire frequency band of the green color component signal be transmitted inasmuch as any loss of green information will be most noticeable in an image reproduced in a color or a black-and-white receiver. This is true because the green component constitutes the greatest proportionate amount of the luminance signal.

The cathode ray tube 32 comprises deflection coils 34 which are supplied with line and field sawtooth scanning waves from the scanning wave generator 18, the scanning frequencies of the tube 32 being the same as the frequencies employed for the scanning device 11 and, in this illustrated embodiment, are 180 fields per second, 525 line double-interlaced. Cooperating with the cathode ray tube 32 is a scanning device, here shown as a camera tube 36 with associated projection lenses 38. If necessary, an adjustable diaphragm 40 may be added to vary the apertures of the lenses 38 in order to obtain a suitable light level for the scanning device.

The camera tube 36 is provided with a deflection yoke 42 which is driven by suitable sawtooth field and line scanning waves generated by scanning wave generator 44. A synchronous generator 46 generates the suitable vertical and horizontal drive pulses which are applied to the scanning wave generator 44 and to a camera control unit 48 associated with the scanning device 36.

The relationship between the horizontal and vertical drive pulses generated by the generator 46 is selected to yield a 525 line double-interlaced picture in accordance with the conventional monochrome transmission standards, more particularly, a vertical drive frequency of nominally 60 cycles and a horizontal drive frequency of nominally 15,750 cycles. The synchronizing generator 46 also develops composite blanking and composite synchronizing signals in the usual manner and supplies them to the camera control unit 48. The camera control unit 48, in response to the signals generated by the synchronizing generator 46 and to the video signals produced by the camera tube 36 produces a standard luminance signal Y, with modulated red and blue color component line portions.

In the conversion of the sequential video information signal from 180 field scansion standard to the 60 field scansion standard, the broadband green color component portion of the video signal is applied to the cathode ray tube 32 during a field scansion of $1/180$ of a second, the 5 mc./s. carrier signal modulated by the red color component portion is applied to the cathode ray tube during the next successive field scansion of $1/180$ of a second, and the 7 mc./s. carrier signal modulated by the blue color component portion is applied to the cathode ray tube 32 during the following $1/180$ of a second. A field scansion by the scanning device 36 takes place in approximately $1/60$ of a second and, hence, it takes three times as long for the camera tube 36 to scan the face of the cathode ray tube 32 as it takes for the picture to be initially placed thereon. By selecting a phosphor suitable for 60 cycle double-interlaced scanning, such as, for example, willemite, all three primary color components of the video signal will be satisfactorily reproduced by the scanning device 36 each field scansion and an entire color picture will be reproduced every two field scansions.

Cathode ray tubes, such as the tube 32, commonly possess a curved transfer chracteristic which results in a transfer gradient ranging from 2.5 to 3.5. The gamma control unit 20 is therefore added into the system to correct the color component portions of the video signal derived by the camera tube 11 before they are reproduced by the cathode ray tube 32. This assures that the images reproduced on the face of the cathode ray tube 32 represent the proper color components of the object field 10.

The standard luminance signal developed by the camera tube 36 is then combined with the proper line and field blanking signals in the camera control unit 48 and applied simultaneously to a 0–4 mc./s. filter 50, a 5 mc./s. demodulator 52 and a 7 mc./s. demodulator 54. The filter 50, which may be of a conventional type, passes those components of the luminance signal within a 0 to 4 mc./s. frequency range and, accordingly, passes only the green color component line portions of the luminance signal. A 4 mc./s. passband corresponds to a resolution of approximately 420 lines and, hence, excellent detail of a reproduced image is assured. The red and blue color component line portions are separated from the luminance signal by the demodulators 52 and 54, the demodulators being tuned for 5 mc./s. and 7 mc./s. operation, respectively. The demodulators 52 and 54, which may be of a conventional type, separately detect the red and blue color component line portions of the luminance signal.

The three color component line portions of the luminance signal are then applied in separate channels, as indicated, to a matrixor 56 wherein the green, red and blue line component portions of the luminance signal are combined in a suitable manner by addition and subtraction to yield the NTSC signals Y, I and Q. The matrixor 56 may be of a conventional type and need not be described in detail herein. Coupled to the output of the matrixor 56 is a further gamma control unit 58 which is employed to correct the luminance and chrominance signals for the transfer gradient of the cathode ray tubes employed in conventional black-and-white color receivers, as is usually done in the standard television system.

As presently contemplated, the luminance signal Y is transmitted as an amplitude modulation of the transmitter carrier in the same manner as conventional black-and-white transmission. The quadrature subcarriers, modulated by the Q and I signals, are likewise transmitted as amplitude modulations of the main carrier. At at conventional black-and-white receiver, the Q and I signal components are rendered ineffective by the integration characteristics of the eye and the only Y modulation is effective. In a color receiver, the Y components provide the principal detail of the picture and the Q and I components provide the color intensity.

Referring now to FIGURE 2, there is represented another embodiment of the invention for providing simultaneous color signals. As shown, the camera includes a scanning device 60 of the image orthicon type with a cooperating lens 61 which focuses images of an object field 62 on the light sensitive surface of the tube 60. Between the lens 61 and the tube 60 there is interposed a color disk 63 rotating about an axis 64 which serially presents different color aspects of the field 62 to the tube 60. As described above, the disk comprises one or more sets of color filters arranged angularly around the periphery thereof so that as the disk rotates different color filters are interposed in the path of the light of the tube 60.

The scanning beam in the tube 60 is deflected in the line and field directions by a suitable scanning yoke 65 energized with respective sawtooth waves from a camera control unit 66. For producing a 525 line double-interlaced scanning pattern, a color synchronizing generator 67 is provided which generates line drive pulses at a frequency of 47,250 cycles per second and field drive pulses at a frequency of 180 cycles per second. To maintain proper color synchronization, the generator 67 also produces composite line and field blanking signals and distinctive color synchronizing pulses which recur at the frequency of selected color, for example, green.

The line drive pulses are supplied from the generator 67 via a scanning wave generator 68 to the camera control unit 66 as indicated by the labeled lines. Line deflecting sawtooth waves are produced in the unit 66 and supplied to the deflection yoke 65 of the camera tube 60. Field drive pulses are supplied from the generator 67 through the generator 68 to the camera control unit 66, as indicated by the labeled lines, and field deflection sawtooth waves are produced in the control unit 66 and supplied to the deflection yoke 65 of the tube 60.

The sequential color video signal developed by the camera tube 60 is supplied to the camera control unit 66, as indicated, and combined therein with the composite line and field blanking waves from the generator 67. Thereupon, the video signal is supplied through a gamma control unit 68 to a color signal separator 71 which separates the green, red and blue color component portions of the video signal and supplies the green color component at an output lead 71G, the red color component at an output lead 71R and the blue color component at an output lead 71B. As in the FIGURE 1 arrangement, the color signal separator 71 is activated by color blanking pulses supplied from the color synchronizing generator 67 by way of the camera control unit 66 and by field blanking pulses applied from the generator 68 through the control unit 66. The gamma control unit 68 corrects the primary color component portions of the video signal in order to provide these portions with the proper amplitude and phase relation.

The leads 71G, 71R and 71B connect the green, red and blue color component portions, respectively, to emitter follower circuits 72G, 72R and 72B, which are independently operative to yield color component portions corresponding to the proper proportions of a standard luminance signal. More particularly, the emitter follower circuit 72G is effective to reduce the magnitude of the green color component portion to 59% of its original magnitude, the emitter follower circuit 72R reduces the magnitude of the red color component portion to 30% of the original value and the emitter follower circuit 72B is effective to reduce the blue color component portion to 11% of its original value.

According to the invention, the luminance or green color component signal is applied to a 0–10 mc./s. bandpass filter 74 and the red and blue color component signals are supplied to a pair of 0–1 mc./s. bandpass filters 76 and 78. The filters may be of a conventional type and, accordingly, the filter 74 passes all the components of the green color component signal within a 0 to 10 mc./s. frequency range and the filters 76 and 78 pass all the components of the chrominance signals within a 0 to 1 mc./s. frequency range. From the filter 74 the luminance signal is applied to a cathode ray tube 80 which sequentially reproduces the broadband green component portions of the luminance signal. Connected to the output terminals of the bandpass filters 76 and 78 are a 3 mc./s. modulator 82 and a 5 mc./s. modulator 84, the modulators being gated by red and blue scansion pulses, respectively, as indicated by the labeled lines. Line drive pulses are also supplied to the modulators 82 and 84 to insure that the carrier starts in-phase with each horizontal line scan. These modulators respectively supply a 3 mc./s. carrier signal and a 5 mc./s. carrier signal modulated by the frequency limited red and blue color component signals each time they are gated or enabled by red and blue field scansion pulses. The red and blue scansion or gating pulses are generated by the color synchronizing generator 67 each time the camera is exposed to the red and blue segments, respectively, of the filter disk 63 while the camera is scanning the object field 62. Accordingly, the modulator 82 is cut off during the time the camera is exposed to the green and blue segments of the filter disk 63 and the modulator 84 is cut off during the time the camera is exposed to the green and red segments of the disk 63. During every six field scans by the camera, therefore, the frequency limited red and blue color component signals are modulated onto 3 and 5 mc./s. carrier signals, respectively, the odd and even lines being modulated alternately.

The output terminals of the modulators 82 and 84 are connected to the input of a cathode ray tube 86 which sequentially reproduces the frequency limited and modulated red and blue color component signals. The cathode ray tubes 80 and 86 include deflection coils 88 and 90, respectively, which are simultaneously supplied with line and field sawtooth scanning waves from the scanning wave generator 68. By supplying the deflection coils in parallel with the suitable scanning waves, it is possible to obtain images on the tubes which are substantially identical in size and linearity. The scanning frequencies for the tubes 80 and 86 are the same as those employed for the scanning device 60 and, in this illustrated embodiment, are 180 fields per second, 525 lines double-interlaced.

Cooperating with the cathode ray tubes 80 and 86 are two pickup scanning devices here shown as camera tubes 92 and 94, respectively, with associated projection lenses 96 and 98. As in the FIGURE 1 arrangement, adjustable diaphragms 100 and 102 may be added to vary the apertures of the lenses 96 and 98, respectively, so as to obtain a suitable light level for the scanning devices. As mentioned above, the broadband green color component signal reproduced by the cathode ray tube 80 recurs at a frequency which is three times faster than the normal NTSC frequency rate. The cathode ray tube 80 and its associated camera tube 92 form the means for converting the green color component signal into a signal meeting the NTSC standard as to frequency and duration. The cathode ray tube 86 and associated camera tube 94 will, as described more fully hereinbelow, form the means for providing chrominance signals meeting the NTSC standard.

The camera tubes 92 and 94 are provided with respective deflection yokes 104 and 106 which are driven by suitable sawtooth field and line scanning waves generated by a scanning wave generator 108. A synchronous generator 110 generates the suitable vertical and horizontal drive pulses which are applied to the scanning wave generator 108 and to the camera control units 112 and 114 associated with the camera tubes 92 and 94, respectively.

The relationship between the horizontal and vertical drive pulses is selected to yield a 525 line double-interlaced picture in accordance with the conventional transmission standards, more particularly, a vertical drive frequency of nominally 60 cycles and a horizontal drive frequency of 15,750 cycles. The synchronizing generator 110 also develops composite blanking and composite synchronizing signals in the usual manner and applies them to the two camera control units 112 and 114. The camera control unit 112, in response to the signals generated by the synchronizing generator 110 and to the video signals produced by the camera tube 92, provides a proper green color component signal. The camera control unit 114, on the other hand, is responsive to the signals generated by the synchronizing generator 110 and to the video signals produced by the camera tube 94 to provide a frequency limited and modulated red and blue component line portions representative of the red and blue information.

In the conversion of the luminance signal G to the 60 field scansion standard, the properly proportioned green color component signal is applied to the cathode ray tube 80 every 1/60 of a second, the signal duration being 1/180 of a second. It takes the scanning device 92 approximately 1/60 of a second to scan the face of the cathode ray tube 80. Thus, it takes three times as long for the camera tube 92 to scan the face of the cathode ray tube 80 as it takes for the color field to be initially placed thereon. By selecting a phosphor suitable for 60 cycle double-interlaced scanning, such as, for example, willemite, the broadband green color component signal will be satisfactorily reproduced by the scanning device 92 each field scansion and an entire frame will be reproduced every two field scansions. This is also true of the conversion of the frequency limited and modulated red and blue color component signals from the 180 field scansion standard to the 60 field scansion standard by the cathode ray tube 86 and the cooperating camera tube 94.

Because cathode ray tubes, such as the tubes 80 and 86, commonly possess a curved transfer characteristic resulting in a transfer gradient which ranges from 2.5 to 3.5, the gamma control unit 70 is added into the system to correct the different color component signals before they are reproduced by the cathode ray tubes 80 and 86. This assures that the images reproduced on the face of the cathode ray tubes represent the proper color components of the object field 62.

The green color component signal developed by the camera tube 92 is then combined with the proper line and field blanking signals in the camera control unit 112 and applied to a matrixor 116 through a conductor 117. The chrominance signal developed by the camera tube 94 is similarly combined with the proper line and field blanking signals in the camera control unit 114 and applied through a conductor 118 to a 3 mc./s. demodulator 120 connected in parallel with a 5 mc./s. demodulator 122. The demodulators 120 and 122, which may be of a conventional type, are tuned for 3 mc./s. and 5 mc./s. operation and, accordingly, separately detect the red and blue color component line portions of the chrominance signal.

In the matrixor 116, the green color component signal G is combined in a suitable manner with the frequency limited red and blue color component line portions to yield the standard NTSC luminance and chrominance signals, Y, I and Q. The Y, I and Q signals are thereafter applied to a further gamma control unit 124 wherein the signals are gamma corrected to compensate for the nonlinear transfer characteristics of the cathode ray tubes employed in conventional color and black-and-white receivers.

Similar to the FIGURE 1 arrangement, the Y signal is transmitted as an amplitude modulation of the transmitter carrier and the quadrature side carriers, modulated by the I and Q signals, are transmitted as amplitude modulations of the main carrier.

It will be understood that the invention is susceptible to considerable modification and not limited to the above-described illustrative embodiments. For example, the cathode ray tube 80 scanning device 92 arrangement may be employed to convert a luminance signal containing equal contributions from the red, blue and green color components into a standard NTSC luminance signal. This may be implemented by adding the outputs of the emitter follower circuits 72R and 72B into the input of the 0–10 mc./s. bandpass filter 74. Accordingly, all modifications and variations within the skill of the art are included within the spirit and intended scope of the invention as defined by the following claims.

I claim:

1. Apparatus for developing color television signals comprising image scanning means for developing sequential color information signals representing different color components of an object field, filter means for dividing the information signals into selected frequency component bands, modulation means for modulating the selected frequency components of at least one of the color information signals, image reproducing means for sequentially reproducing images corresponding to the modulated selected frequency components of the color information signal and to the unmodulated selected frequency components of the color information signals, cooperating camera means for converting the sequentially reproduced images into a color field signal containing corresponding modulated and unmodulated color component line portions, detection means for separately detecting the modulated and unmodulated color component line portions of the color field signal and combining means for combining the separately detected color component line portions to thereby provide simultaneous color signals.

2. Apparatus according to claim 1 wherein the filter means includes a plurality of filters for transmitting the information signals over a broad frequency range and for transmitting the information signals over a limited frequency range.

3. Apparatus according to claim 2 wherein the modulator means includes a plurality of modulators responsive to the frequency limited color information signals for modulating only the frequency limited red and blue color information signals onto carrier signals of differing frequencies.

4. Apparatus according to claim 3 wherein the detection means includes filter means for separating the green color component line portion from the modulated red and blue color component line portions of the color field signal and a plurality of demodulators tuned to the different carrier frequencies of the red and blue color component line portions for separately detecting the red and blue color component line portions of the color field signal.

5. Apparatus according to claim 4 wherein the combining means includes matrixing means for combining the separately detected green, red and blue color component line portions of the color field signal to thereby provide luminance and chrominance signals.

6. Apparatus according to claim 1 wherein the image reproducing means includes a cathode ray tube for sequentially reproducing images corresponding to the selected frequency components of the modulated color information signal and to the selected frequency components of the unmodulated color information signals and wherein the cooperating camera means includes a scanning device for scanning the face of the cathode ray tube to thereby provide a color field signal containing modulated and unmodulated line portions corresponding to the modulated and unmodulated color information signals.

7. Apparatus for developing color television signals comprising image scanning means for developing sequential color information signals representing different color components of an object field, filter means for dividing the information signals into selected frequency component bands, modulation means for modulating the selected frequency components of at least two of the color information signals, image reproducing means for sequentially reproducing images corresponding to the unmodulated selected frequency components of the color information signals and for reproducing images corresponding to the modulated selected frequency components of the color information signals, cooperating camera means for converting the reproduced images into at least one color field signal containing unmodulated color component line portions corresponding to the unmodulated selected frequency components of the color information signals and for converting the reproduced images into at least one other color field signal containing modulated color component line portions corresponding to the modulated selected frequency components of the color information signals, detection means responsive to the second color field signal for separately detecting the modulated color component line portions and combining means for combining the first color field signal with the separately detected color component line positions of the second color field signal to thereby provide simultaneous color signals.

8. Apparatus according to claim 7 wherein the image reproducing means includes a first cathode ray tube for sequentially reproducing images corresponding to the unmodulated selected frequency components of the color information signals and a second cathode ray tube for reproducing images corresponding to the modulated selected frequency components of the color information signals and wherein the cooperating camera means includes a first scanning device for scanning the face of the first cathode ray tube to thereby provide a color field signal containing unmodulated color component line portions corresponding to the unmodulated color information signals and a second scanning device for scanning the face of the second cathode ray tube to thereby provide a color field signal containing modulated color component line portions corresponding to the modulated color information signals.

9. Apparatus according to claim 7 wherein the filter means includes a plurality of filters for transmitting the information signals over a broad frequency range and for transmitting the information signals over a limited frequency range.

10. Apparatus according to claim 9 wherein the modulator means includes a plurality of modulators responsive to the frequency limited color information signals for modulating only the frequency limited red and blue color information signals onto carrier signals of differing frequencies.

11. Apparatus according to claim 10 wherein the detection means includes a plurality of demodulators tuned to the different carrier frequencies of the red and blue color component line portions of the second color field signal for separately detecting the red and blue color component line portions of the second color field signal and supplying the detected portion to the combining means.

References Cited

UNITED STATES PATENTS

| | | | |
|---|---|---|---|
| 2,769,028 | 10/1956 | Webb. | |
| 2,866,847 | 12/1958 | James. | |
| 2,870,249 | 1/1959 | James. | |
| 2,880,267 | 3/1959 | Goldmark et al. | 178—5.4 |
| 3,030,437 | 4/1962 | James et al. | 178—5.4 |

RICHARD MURRAY, Primary Examiner

R. LANGE, Assistant Examiner

U.S. Cl. X.R.

178—5.4, 6.8